United States Patent [19]
Harada

[11] Patent Number: 5,197,054
[45] Date of Patent: Mar. 23, 1993

[54] SUM SIGNAL PROCESSING DEVICE FOR AN OPTICAL DISK DRIVE

[75] Inventor: Toshihisa Harada, Tokyo, Japan
[73] Assignee: NEC Corporation, Tokyo, Japan
[21] Appl. No.: 524,530
[22] Filed: May 17, 1990
[30] Foreign Application Priority Data
 May 18, 1989 [JP] Japan ................................. 1-125607
[51] Int. Cl.⁵ ............................................. G11B 7/00
[52] U.S. Cl. ................... 369/32; 369/44.28; 369/44.35; 369/54; 369/58; 360/67
[58] Field of Search ..................... 369/32, 44.26, 44.28, 369/44.35, 44.36, 54, 58; 360/67, 68

[56] References Cited
U.S. PATENT DOCUMENTS

| | | | |
|---|---|---|---|
| 4,689,779 | 8/1987 | Hayashi et al. | 369/44.36 |
| 4,707,817 | 11/1987 | Yoshio | 369/44.36 |
| 4,884,259 | 11/1989 | Horikawa et al. | 369/44.26 |
| 4,953,151 | 8/1990 | Imanaka | 369/54 |
| 4,989,190 | 1/1991 | Kuroe et al. | 369/58 |

Primary Examiner—Tommy P. Chin
Assistant Examiner—Khoi Truong
Attorney, Agent, or Firm—Sughrue, Mion, Zinn, Macpeak & Seas

[57] ABSTRACT

A sum signal processing device for use in an optical disk drive for detecting a sum signal which is a groove-crossing signal used to detect a relative position of a beam spot for recording and reproducing information from a medium and the medium and a relative velocity in the radial direction of the medium. The device identifies a recorded portion on the basis of high-frequency components and, in the recorded portion, processes the high-frequency components to generate a groove-crossing signal, thereby detecting an accurate sum signal.

2 Claims, 9 Drawing Sheets

SUM SIGNAL PROCESSING DEVICE FOR AN OPTICAL DISK DRIVE

BACKGROUND OF THE INVENTION

The present invention generally relates to an optical disk drive and, more particularly, to a sum signal processing device for use in an optical disk drive for detecting a sum signal which is a groove-crossing signal used to detect a relative position of a beam spot for recording and reproducing information from a medium and the medium and a relative velocity in the radial direction of the medium.

An optical disk drive uses a light beam for recording and reproducing information from a medium. A prerequisite with such a light beam is that it forms an extremely small spot on the surface of the medium and thereby irradiates a desired extremely small area of the latter. Accurate control over the position of the light beam is critical for increasing the storage capacity available of an optical disk drive. Even though the beam spot may be accurately positioned, the disk drive is not satisfactory if the positioning operation is slow. Ideally, therefore, an optical disk has to position the beam spot accurately and rapidly. A predominant implementation for the easy control over the beam spot is a medium having concentric or spiral guide grooves thereon. Specifically, the beam spot is held in a predetermined position relative to the guide grooves so that it may follow a desired track which is a sequence of information.

The relative position of the grooves and the beam spot may be detected by use of a two-segment photodetector (2S-PD) which is composed of two photodetector segments and responsive to a reflection from a medium, as customary in the art. This approach uses the fact that the grooves diffract the reflection of a beam spot from the medium. This kind of diffraction itself has been discussed in various fields and, hence, only the result of such a phenomenon will be described herein. Specifically, a medium is provided with grooves and lands each intervening between nearby lands. When a reflected beam from the medium is incident to the 2S-PD, it produces a particular light intensity distribution on the individual photodetectors. A sum signal or groove-crossing signal is produced by combining the light current produced by the two photodetectors, while a difference signal is produced by substracting one of them from the other. The difference signal is representative of stable position information because noise components are cancelled. For this reason, the difference signal is used as a tracking error signal for positioning the beam spot relative to the grooves.

With the difference signal alone, however, it is impossible to identify the direction of the beam spot motion at a given time. Identifying the instantaneous direction of movement of the beam spot is a requisite because the position information obtained from the medium is fed back for positioning purpose. It has been customary to determine the moving direction by referencing not only the difference signal but also the sum signal, i.e., by comparing the difference and sum signals with respect to phase. A problem with this conventional scheme is that the sum signal picks up even noise because the entire quantity of reflection is detected. Especially, recorded information is superposed on the sum signal, as will be apparent from the fact that the sum signal is used to reproduce recorded information. These obstruct the accurate detection of a sum signal or groove-crossing signal representative of position information.

SUMMARY OF THE INVENTION

It is therefore an object of the present invention to provide a sum signal processing device for an optical disk drive which eliminates the drawbacks particular to the prior art as discussed above.

It is another object of the present invention to provide a generally improved sum signal processing device for an optical disk drive.

In accordance with the present invention, a sum signal processing device for an optical disk drive using an optical disk medium having concentric or spiral guide grooves, and comprising a photodetector responsive to light reflected from the medium to produce a groove-crossing signal having a minimum value in response to light reflected from the guide grooves and a maximum value in response to light reflected from between the guide grooves comprises a data portion detecting circuit for detecting a data portion by separating high-frequency components from the output of the photodetector, a groove-crossing signal detecting circuit for separating low-frequency components from the output of the photodetector, and a voltage switching circuit for switching, in the data portion detected by the data portion detecting circuit, a level of a low-frequency signal detected by the groove-crossing signal detecting circuit.

Also, in accordance with the present invention, a sum signal processing device for an optical disk drive using an optical disk medium having concentric or spiral guide grooves, and comprising a photodetector responsive to light reflected from the medium to produce a groove-crossing signal having a minimum value in response to light reflected from the guide grooves and a maximum value in response to light reflected from between the guide grooves comprises a data portion detecting circuit for detecting a data portion by separating high-frequency components from the output of the photodetector, an envelope detecting circuit for detecting an envelope signal of high-frequency components out of the output of the photodetector, a groove-crossing signal detecting circuit for separating low-frequency components from the output of the photodetector, and a selecting circuit for outputting, on the basis of a result of detection by the data portion detecting circuit, the envelope signal and the low-frequency components in response to the data portion and the other portion, respectively.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, a brief reference will be made to a conventional sum signal processing device for an optical disk drive.

Figure 1:
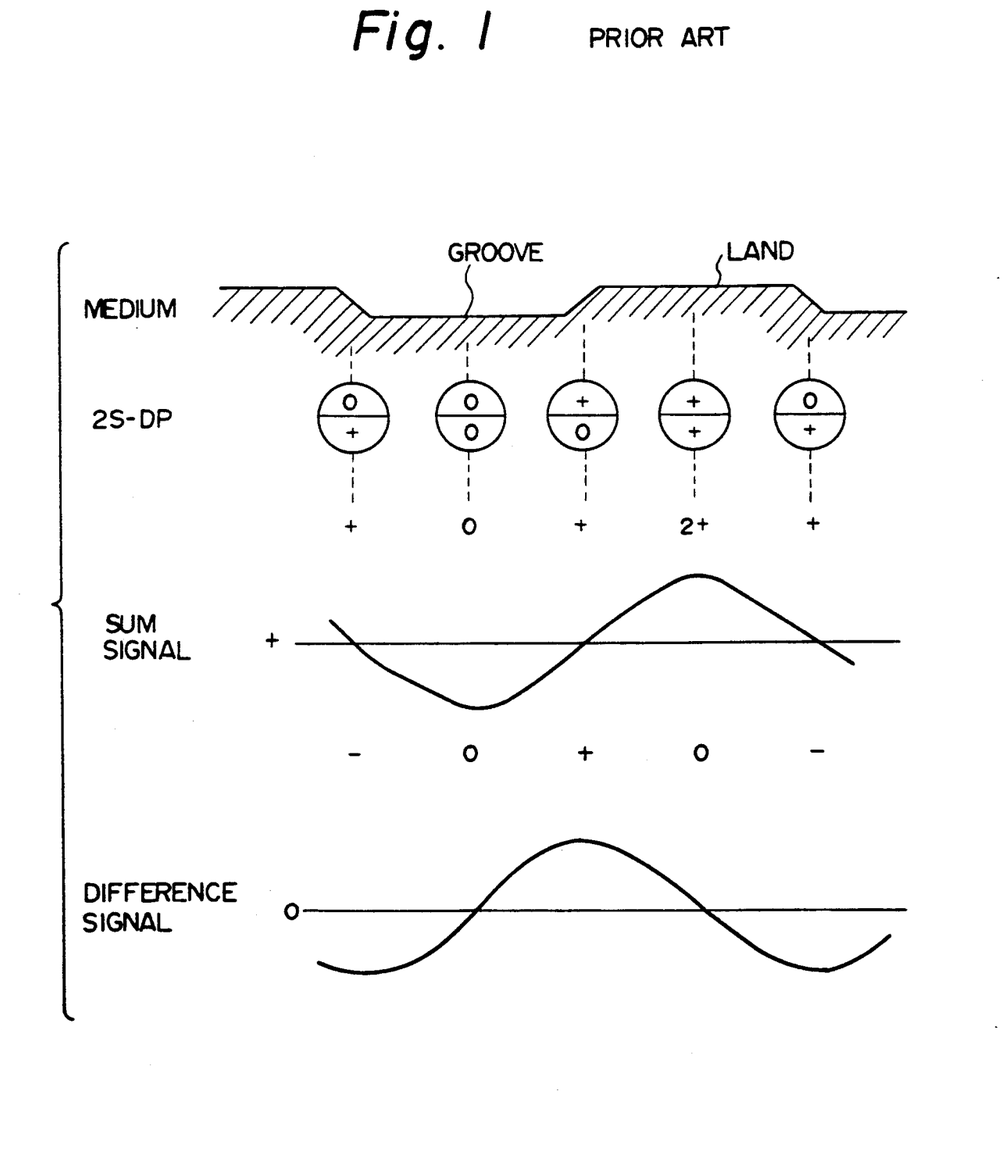
FIG. 1 is a view useful for understanding the prior art.

Referring to FIG. 1 there are shown the configuration of a medium having concentric guide grooves and the outputs of a two-segment photodetector (2S-PD). The 2S-PD is implemented by two photodetectors which are responsive to a reflection of a beam spot from the medium to determine a relative position of the beam spot to the guide grooves. As shown, the medium has grooves and lands each intervening between nearby grooves. When the beam reflected from the medium is incident to the 2S-PD, it produces a particular light intensity distribution on the individual photodetectors of the 2S-PD depending on the irradiated position. In the figure, the symbols "O" and "+" are representative of a dark state and a light state, respectively. A sum signal or groove-crossing signal is representative of the sum of the light intensities (or total light intensity) detected by the two photodetectors, while a difference signal is representative of the difference between such intensities of light. The difference signal serves as table position information because noise components are cancelled. For this reason, the difference signal is used as a tracking error signal for positioning the beam spot relative to the grooves. However, with the difference signal alone, it is impossible to identify the instantaneous direction in which the beam spot is moving. It has been customary, therefore, to determine the moving direction of the beam spot by comparing the sum and difference signals with respect to phase.

However, the sum signal picks up even noise because the entire quantity of reflected light is picked up, as stated earlier. This is problematic when the sum signal or groove-crossing signal which is the position information is to be detected.

Preferred embodiments of the sum signal processing device in accordance with the present invention will be described hereinafter.

Figure 2:
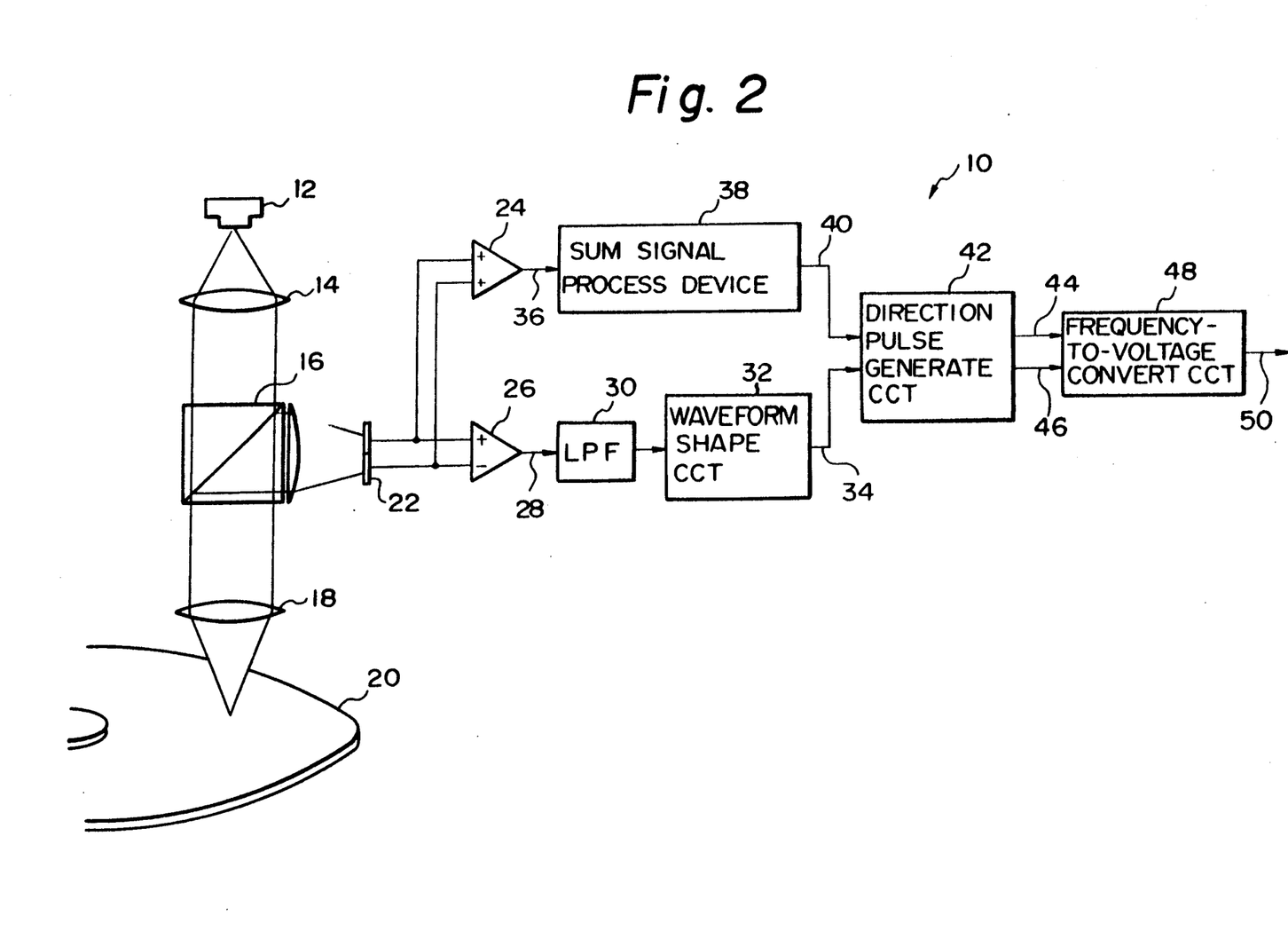
FIG. 2 is a block diagram schematically showing the general construction of a beam spot velocity detecting arrangement of an optical disk drive to which a sum signal processing device of the present invention is applied.

FIG. 2 shows an arrangement for detecting the velocity of a beam spot and to which the present invention is applied. The arrangement of FIG. 2, generally 10, constantly monitors reflected light of a beam spot while outputting a voltage associated with the velocity of the beam spot, i.e. a relative speed as measured in the radial direction of the medium. Specifically, the arrangement 10 has a semiconductor laser 12 which emits a laser beam. The laser beam issuing from the laser 12 is propagated through a collimator lens 14, a beam splitter 16 and an object lens 18 to form a beam spot on a medium 20. A reflected beam from the medium 20 is returned through the object lens 18 and then split by the beam splitter 16 to reach a 2D-PD 22. The resultant output of the 2S-PD 22 is fed to a summational amplifier 24 and a differential amplifier 26. The output 28 of the differential amplifier 26 is applied to a low pass filter (LPF) 30 to cut high frequency components which are the source of noise. The filtered output of the LPF 30 is converted into a two-level signal, or track polarity signal, 34 by a waveform shaping circuit 32. On the other hand, the output 36 of the summational amplifier 24 is fed to a sum signal processing device 38 of the present invention and thereby transformed into a two-level signal, or groove-crossing signal, 40. The sum signal processing device 38 will be described in detail later. The track polarity signal 34 and groove-crossing signal 40 are applied to a direction pulse generating circuit 42. The direction pulse generating circuit 42 compares the input signals 34 and 40 with respect to phase and, depending on their phase difference, selectively produces either one of a forward (FWD) pulse 44 and a backward (BWD) pulse 46.

Figure 3:
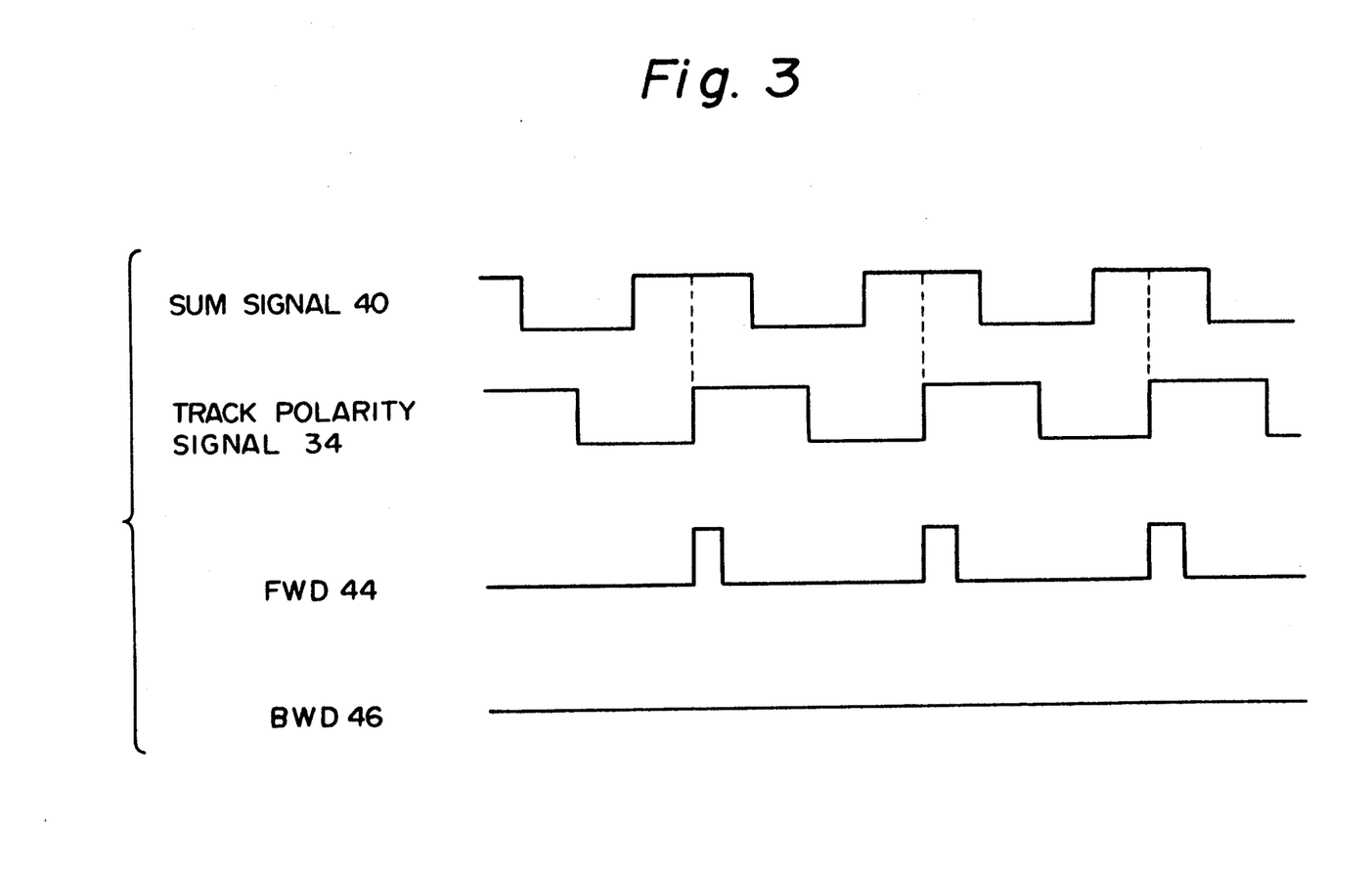
FIG. 3 is a diagram demonstrating the operation of a direction pulse generating circuit included in the arrangement of FIG. 2.

FIG. 3 is a timing chart demonstrating the operation of the direction pulse generating circuit 42. As shown, when the sum signal 40 is in a high level at the positive-going edge of the track polarity signal 34, the circuit 42 produces a FWD pulse 44. Conversely, when the sum signal 40 is in a low level at the negative-going edge of the track polarity signal 34, the circuit 42 generates a BWD pulse 46. The FWD pulse 44 and BWD pulse 46 are applied to a frequency-to-voltage converting circuit 48. The output voltage 50 of this circuit 48 is positive when the FWD pulse 44 is present or negative when the BWD pulse 46 is present.

As stated above, the beam spot velocity detecting arrangement 10 produces two different kinds of signals in response to a reflected beam from the medium 20. Specifically, one signal applied to the differential amplifier 26 has to be the output of the 2S-PD 22 which is split in the radial direction of the medium 20, i.e., it is required to pick up changes ascribable to diffracted light. The other signal applied to the sum signal processing device 38 does not have to be the amplified output of the summational amplifier 24 to which the output of the 2S-PD 22 is fed, i.e., it may be implemented as a signal having simply detected the entire reflected light.

The sum signal processing device 38 generates the groove-crossing signal 40, or definite two-level signal, from the signal on which a signal recorded in the medium 20 has been superposed. Hence, the configuration of the device 38 depends on the manner of superposition of the signal, i.e. the method and the phenomenon by which a signal is recorded in the medium 20. Generally, optical recording is effected by various types of recording mechanisms. In this case, three major types of recording mechanisms (and media) are considered as follows. A first mechanism is such that pits are formed in the lands of a medium which are covered with a reflective film, whereby the reflectivity of recorded area is dark relative to unrecorded area. A second mechanism is such that while the surfaces of the lands are sparingly reflective, pits are formed down to a reflective film underlying the lands so as to increase the reflectivity, whereby information is identified. A third mechanism is similar to the first mechanism so far as the reflective film on the surface of a medium is concerned, but the former is different from the latter in that pits representative of information are formed in the grooves which alternate with lands.

Figure 4:
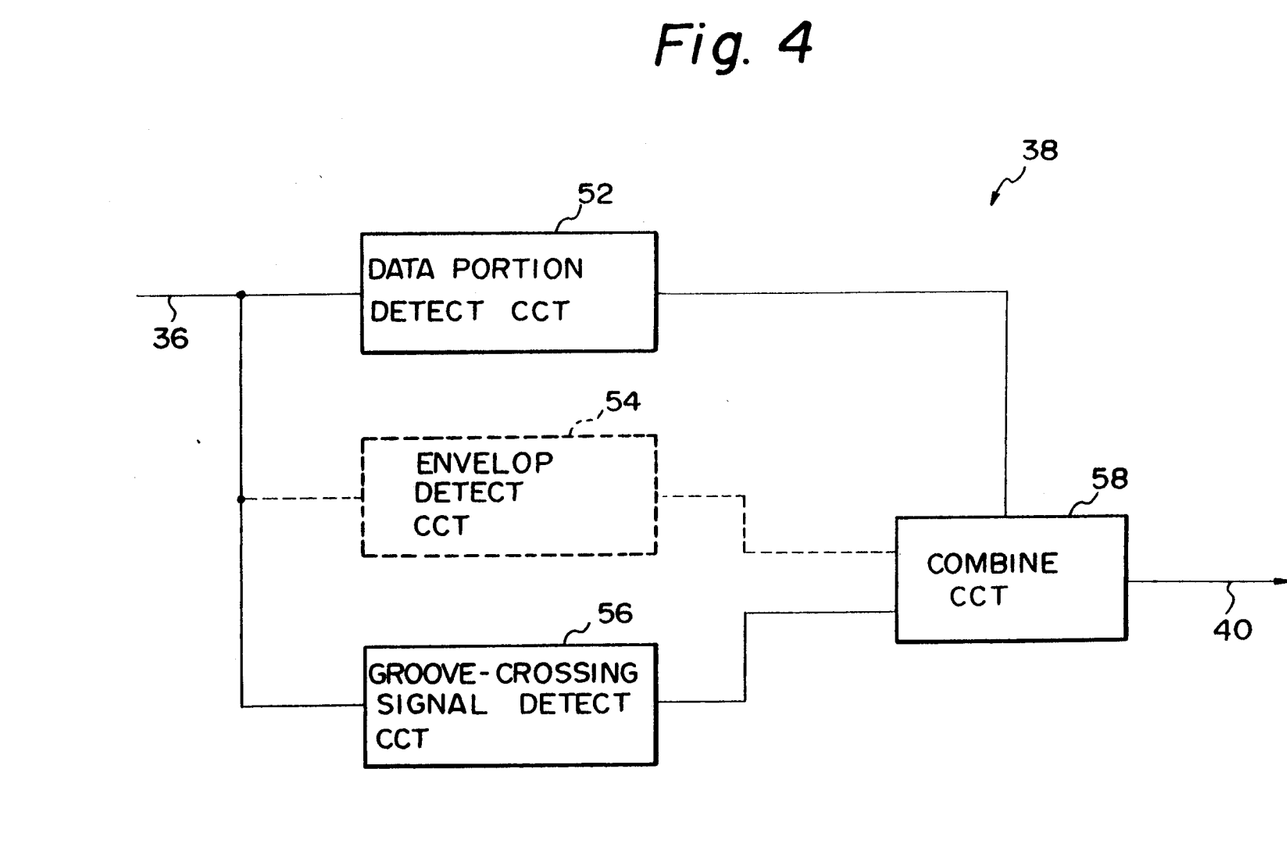
FIG. 4 is a block diagram schematically showing the basic construction of sum signal processing device applied to the velocity detecting device of FIG. 2.

Referring to FIG. 4, the basic construction of the sum signal processing device 38 will be described. As shown, the device 38 has a data portion detecting circuit 52, an envelope detecting circuit 54, and a groove-crossing signal detecting circuit 56 to all of which the output 36 of the summational amplifier 24 is applied. It is to be noted that the envelope detecting circuit 54 is not used in some of the embodiments which will be described. The data detecting circuit 52 detects the portions of the input 36 where information has been superposed, i.e. data portions. The envelope detecting circuit 54 detects the envelope of a data portion or similar high frequency signal. The groove-crossing signal detecting circuit 56 cuts data portions and noise components included in the input 36 to thereby detect only low frequency components. The outputs of the three circuits 52, 54 and 56 are applied to a combining circuit 58 which then produces the two-level groove-crossing signal 40.

The combining circuit 58 serves two different functions, i.e., a function of ouputting as the groove-crossing signal a groove-crossing signal in non-recorded portions and an envelope signal in data portions, and a function of changing the gain of amplification or the level of the groove-crossing signal for optimization. While changing the gain of amplification or the level as mentioned is simply made by selectively outputting groove-crossing and envelope signals concerning the construction and operation, the latter which produces a groove-crossing signal from an envelope signal should be used when the groove-crossing signal detecting circuit 56 fails to produce a satisfactory waveform.

The general construction of the arrangement 10 shown in FIG. 2 and the construction of the sum signal processing device 38 described above will suffice in understanding the basic operation of the present invention. Nevertheless, FIGS. 2 and 4 suggest the possibility of further optimization relating to the fact that the signal fed to the sum signal processing device 38 may be implemented as a signal having detected the total intensity changes of the reflected beam, as mentioned previously. Specifically, while the data portion detecting circuit 52 and envelope detecting circuit 54 are expected to pick up high frequency components out of data portions, the groove-crossing signal detecting circuit 56 needs the entire plane of a reflection inclusive of the influence of diffraction. An optical disk drive is sometimes constructed to output a reproduced signal by detecting only the portions of a reflection which are free from the influence of diffracted light in order to output of a reproduced signal efficiently. In such a case, a photodetector is divided into a number of segments so as to pick up signals at particular positions matching the purpose. When use is made of such a divided photodetector, it will suffice to apply a signal associated with the portions where the influence of diffracted light is not significant to the data portion detecting circuit 52, and to apply a signal associated with the portions where the influence is significant to the groove-crossing signal detecting section 56.

Figure 5:
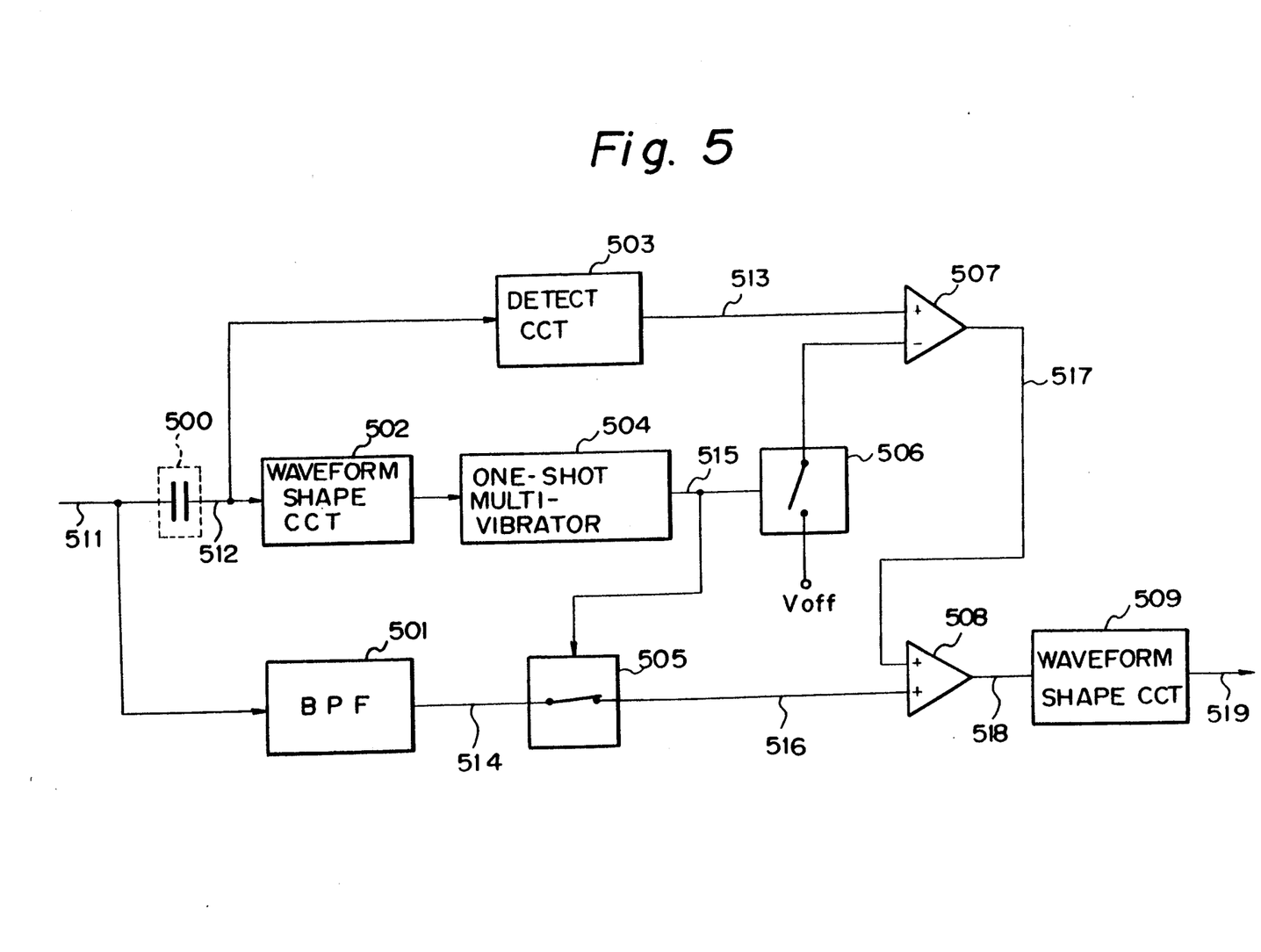
FIG. 5 is a block diagram schematically showing a first embodiment of the sum signal processing device in accordance with the present invention.
Figure 6:
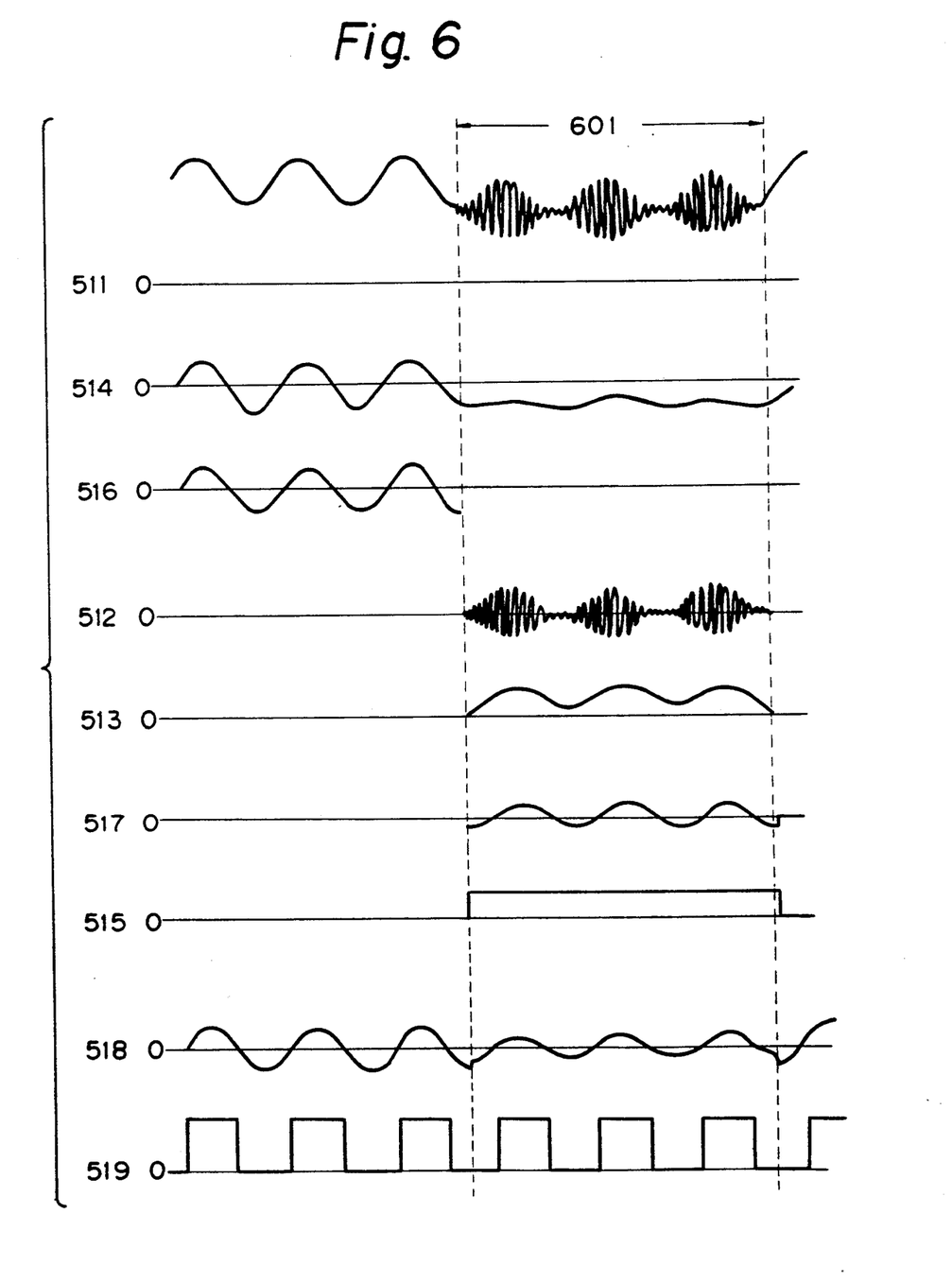
FIG. 6 is a diagram representative of signals appearing in various portions of the device shown in FIG. 5.

First Embodiment (see FIGS. 5 and 6)

A first embodiment which will be described with reference to FIGS. 5 and 6 is suitable for use with equipment of the type using, among the three different recording mechanisms stated earlier, the first-mentioned recording mechanism. As shown, the output 36 (511, FIGS. 5 and 6) of the summational amplifier 24 is outputted with high frequencies being superposed thereon in a data portion 601, FIG. 6. The output 511 is fed to a band pass filter (BPF) 501 which passes the frequency of a signal resulting from the traverse of a groove, i.e. a groove-crossing signal. By cutting high frequencies and DC components, the BPF 501 produces a signal 514. A capacitor 500 outputs a signal 512 by passing only high-frequency AC contained in the output 511. A detecting circuit 503 detects an envelope out of the signal 512 to produce an envelope signal 513. A waveform shaping circuit 502 digitizes the signal 512 to produce a pulse train. A one-shot multivibrator 504 increases the pulse width of the pulse train to output a signal 515. This signal 515 is in a high level in a data portion and in low level in a non-recorded portion. Switches 505 and 506 are turned on and off by the signal 515. The switch 505 passes the signal 514 in non-recorded portions and cuts it in data portions, while the switch 506 feeds a predetermined voltage Voff to the inverting input of a differential amplifier 507 only in data portions. The differential amplifier 507 lowers the level of the envelope signal 513 by Voff to produce a signal 517 the amplitude of which has the center at the zero level. The signals 516 and 517 which pass the switches 505 and 506, respectively, are converted into a groove-crossing signal 518 by a summational amplifier 508 and then converted into a two-level signal 519 by a waveform shaping circuit 509. The two-level signal 519 changes at zero-crossing points.

Figure 7:
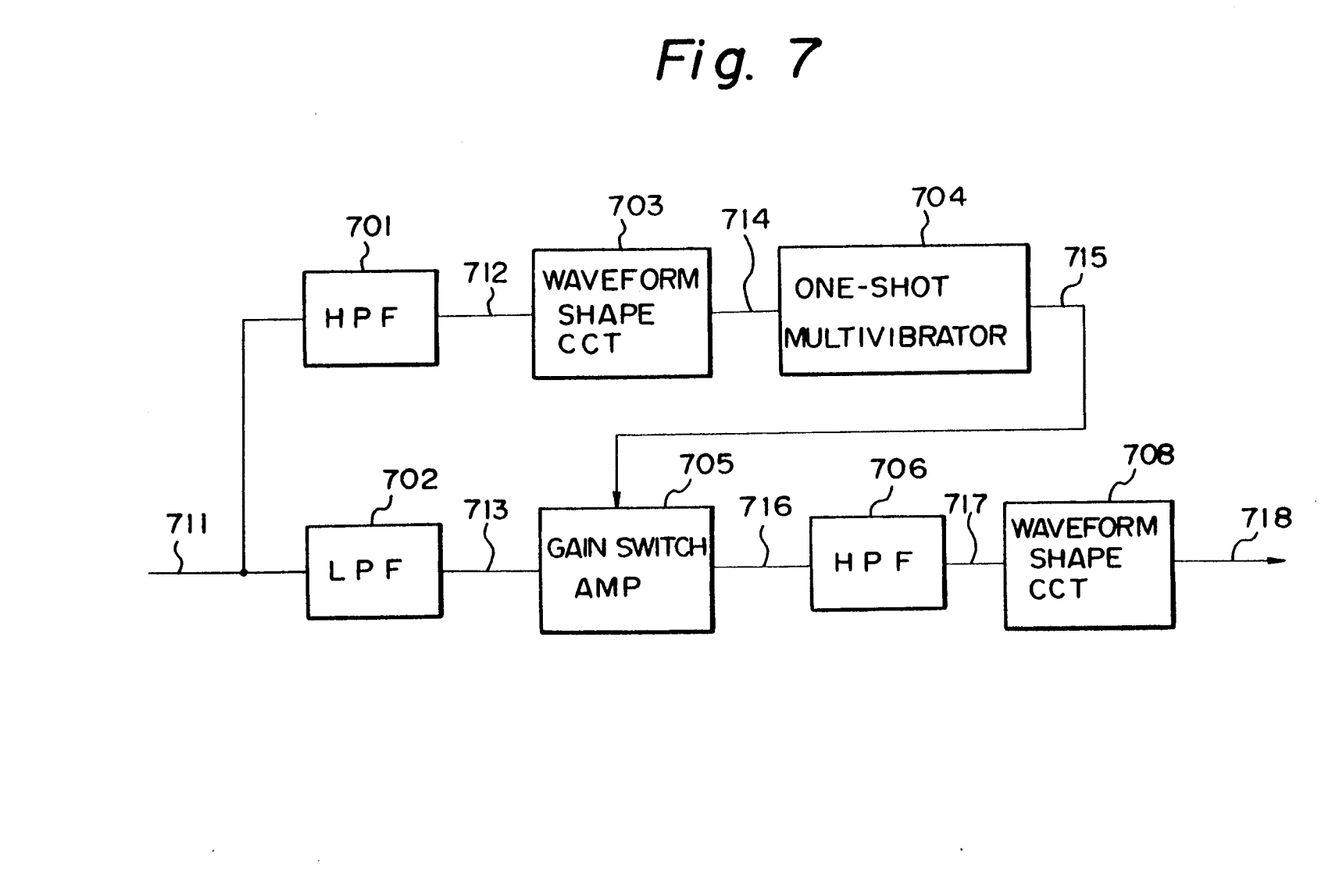
FIG. 7 is a block diagram showing a second embodiment of the present invention schematically.
Figure 8:
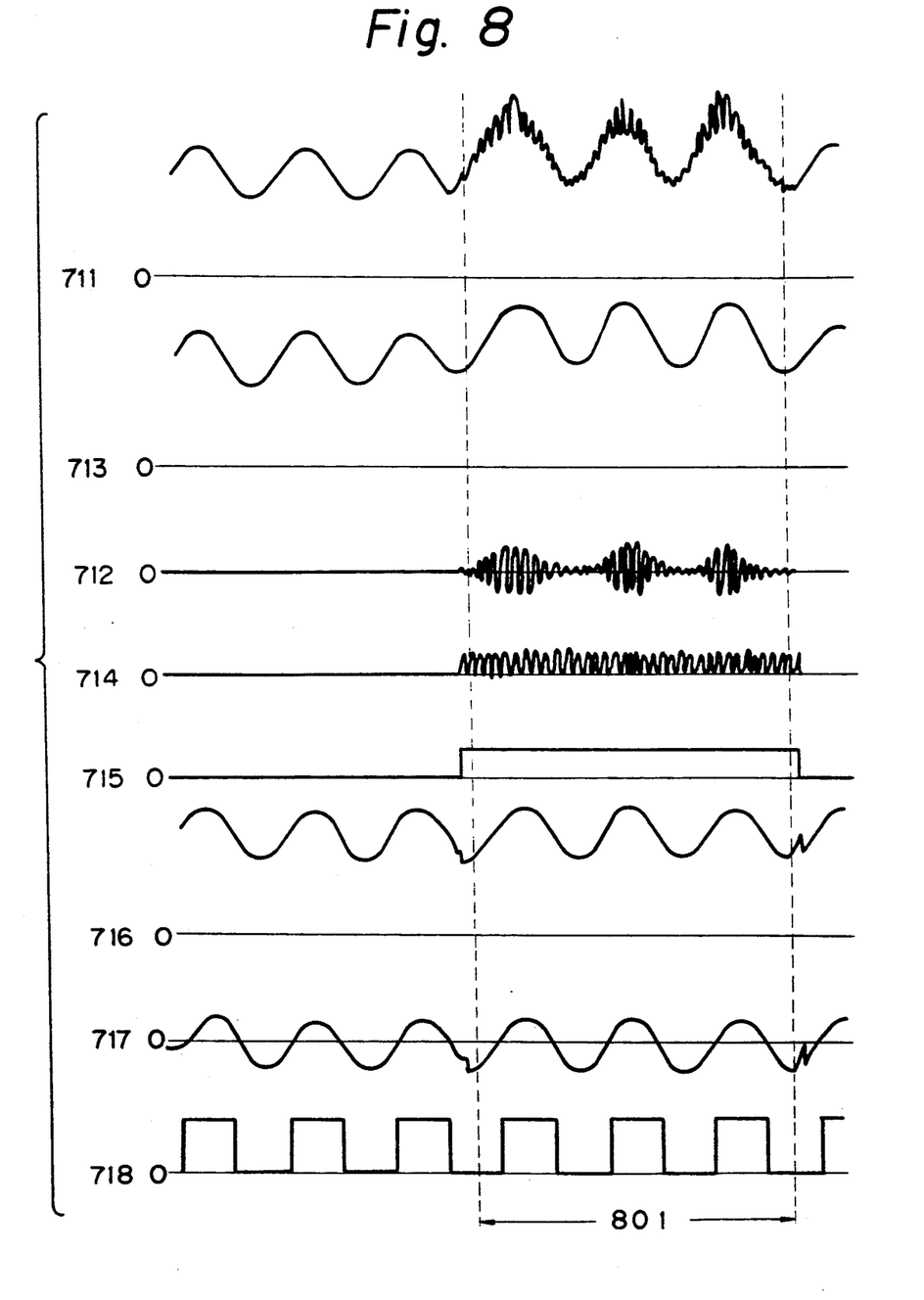
FIG. 8 is a diagram indicative of signals appearing in various portions of the device shown in FIG. 7.

Second Embodiment (see FIGS. 7 and 8)

A second embodiment of the present invention is advantageously applicable to equipment implemented by the second recording mechanism which forms data in the lands to increase the reflectivity, as stated earlier. This particular embodiment uses a combining method which changes the gain of amplification of a groove-crossing signal. As shown in FIGS. 7 and 8, the output 36 (711) of the summational amplifier 24 is outputted with high frequencies being superposed in a data portion 801, FIG. 8. The output 711 is fed to a high pass filter (HPF) 701 and a LPF 702. The HPF 701 produces only the high frequencies as a signal 712 and delivers it to a waveform shaping circuit 703. The waveform shaping circuit 703 samples the input 712 by using a threshold level which is slightly higher than the zero level. The resulting output 714 of the circuit 703 is applied to a one-shot multivibrator 704. Since the multivibrator 704 is constructed to produce output pulses the width of which is greater than the maximum period of a data signal, it outputs a signal 715 which turns to a high level when a high frequency signal exists. More specifically, the circuitry extending from the HPF 701 to the one-shot multivibrator 704 plays the role of a data portion detecting circuit. The LPF 702 passes only a groove-crossing signal 713 by cutting high-frequency components. In a data portion, the signal 713 passes the center of the high-frequency amplitude due to the nature of the LPF 702 and is, therefore, greater than in a non-recorded portion. The signal 713 is fed to a gain switching amplifier 705 which switches over the gain in response to the signal 715. In this embodiment, the amplifier 705 is constructed to increase the gain for a data portion than for a non-recorded portion, so that its output 716 has a constant amplitude and constant maximum and minimum values. A HPF 706 cuts the DC components of the signal 716 to produce a signal 717. A waveform shaping circuit 708 converts the signal 717 into a two-level signal 718 which changes at zero-crossing points.

Figure 9:
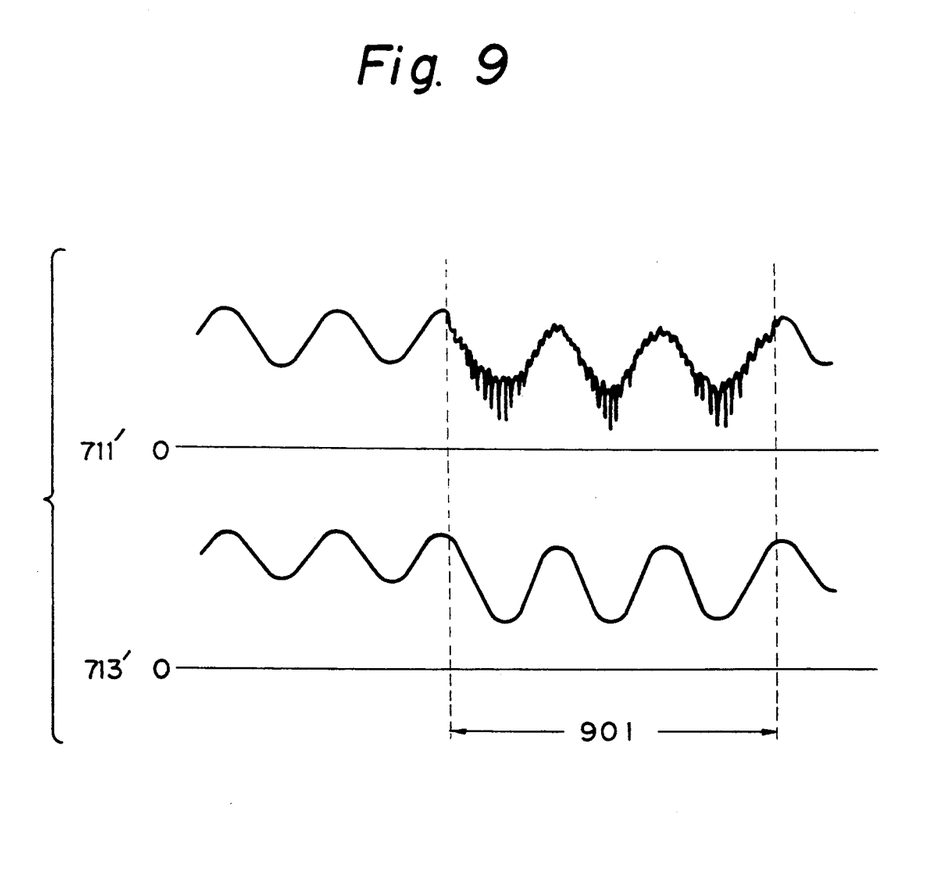
FIG. 9 is a diagram showing waveforms which are representative of a third embodiment of the present invention.

Third Embodiment (see FIGS. 7, 8 and 9)

This embodiment is advantageously practicable with equipment of the type using third recording mechanism and, like the second embodiment, uses a matching circuit which switches over the gain. The third embodiment is essentially the same in construction as the second embodiment. However, as FIG. 9 indicates, a groove-crossing signal 713' of the third embodiment is smaller than the signal 713 of the second embodiment in a data portion 901. Therefore, the third embodiment can be implemented by the circuitry of the second embodiment only if the characteristic of the gain switching amplifier 705 is reversed to change the constant.

The second and third embodiments described above each matches the signal by adjusting the gain, i.e., effects adequate matching on the basis of the gain. When the amplitude of the signal varies from one position to another in the radial direction of a medium, as is the case with some media, use may be made of a common address counter for recognizing the current track number. Then, an adequate gain will be determined on the basis of the recognized track number to thereby change the constant of the gain switching amplifier. The first embodiment constructed to detect an envelope may also use such an implementation in its combining stage.

Referring again to FIG. 2, the sum signal 40 generated by any of the illustrative embodiments is combined with the track polarity signal 34 and thereby converted into a velocity signal 50. In general, accurate detection of the sum signal 40 is important when an optical head has started to move and when it is about to stop. Specifically, while an optical head is moved at comparatively high speed, the direction of movement is identified and, therefore, tracks can be counted only by monitoring the track polarity signal 34. Hence, a prerequisite with the illustrative embodiments is that the HPF and LPF each be provided with a particular time constant which offers a desirable effect at the time when the sum signal 40 is needed.

The present invention assumes an optical disk drive wherein a head having the maximum seek rate of 0.5 meters per second and the track pitch of 1.6 micrometers. Therefore, the groove-crossing signal and the track polarity signal each varies over the frequency range of DC to 312.5 kilohertz. It follows that the track polarity signal which constantly monitors tracks has to detect such a frequency band. In the light of this and to cut high-frequency noise, it is preferable that the difference signal be detected via a LPF whose pass band is lower than 1 megahertz. On the other hand, concerning the sum signal, the direction has to be detected when the frequency ranges from about 100 hertz to about 30 kilohertz, while the high frequency in data portions lies in the range of 1 megahertz to 3 megahertz. Thus, the LPF and HPF of the illustrative embodiments may each be provided with a time constant with the frequency of several hundred kiloherz being used as a reference.

Various modifications will become possible for those skilled in the art after receiving the teachings of the present disclosure without departing from the scope thereof.

What is claimed is:

1. A sum signal processing device for an optical disk drive using an optical disk medium having concentric or spiral guide grooves for producing a groove-crossing signal having a minimum value in response to light reflected from the guide grooves and a maximum value in response to light reflected from between the guide grooves, said optical disk drive comprising photodetector means for producing a sum signal representative of an intensity of light reflected from said optical disk medium, said device comprising:
    data portion detecting means for detecting a presence or absence of a data portion in said sum signal by detecting high-frequency components in said sum signal;
    envelope detecting means for producing an envelope signal of high-frequency components out of said sum signal; and
    means for combining, when said data portion detecting means detects the absence of a data portion, said sum signal and said envelope signal and for outputting the resulting combined signal as said groove-crossing signal and for outputting, when said data portion detecting means detects the presence of a data portion, only said envelope signal as said groove-crossing signal.

2. A sum signal processing device for an optical disk drive using an optical disk medium having concentric or spiral guide grooves for producing a groove-crossing signal having a minimum value in response to light reflected from said guide grooves and a maximum value in response to light reflected from between said guide grooves, said optical disk drive comprising photodetector means for producing a sum signal representative of an intensity of light reflected from said medium, said device comprising:
    means for separating high-frequency AC components from said sum signal;
    data portion detecting means for detecting time periods of a presence and absence of said high-frequency AC components;
    means for generating an envelope signal of said high-frequency AC components;
    level converting means for outputting, when said data portion detecting means detects the presence of high-frequency AC components, said envelope signal by converting said envelope signal such that the center of amplitude of said envelope signal coincides with a zero level or outputting, when said data portion detecting means detects the absence of high-frequency AC components, only said envelope signal;
    means for removing high frequency components and DC components from said sum signal to thereby produce a corrected sum signal;
    selective outputting means for outputting said corrected sum signal only while said data portion detecting means detects the absence of high-frequency AC components; and
    means for producing said groove-crossing signal by combining an output of said level converting means and an output of said selective outputting means.

* * * * *

UNITED STATES PATENT AND TRADEMARK OFFICE
CERTIFICATE OF CORRECTION

PATENT NO. : 5,197,054

DATED : March 23, 1993

INVENTOR(S) : Toshihisa HARADA

It is certified that error appears in the above-identified patent and that said Letters Patent is hereby corrected as shown below:

Col. 3, line 36, delete "c ossing" and insert --crossing--.

Signed and Sealed this

Twenty-eighth Day of December, 1993

Attest:

BRUCE LEHMAN

Attesting Officer

Commissioner of Patents and Trademarks